United States Patent
Shi et al.

(10) Patent No.: US 8,970,581 B2
(45) Date of Patent: Mar. 3, 2015

(54) SYSTEM AND METHOD FOR INTERACTIVE CONTOURING FOR 3D MEDICAL IMAGES

(75) Inventors: Feng Shi, Shanghai (CN); Xiaoliang Li, Shanghai (CN); Shoupu Chen, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 468 days.

(21) Appl. No.: 13/343,102

(22) Filed: Jan. 4, 2012

(65) Prior Publication Data

US 2013/0169639 A1    Jul. 4, 2013

(51) Int. Cl.
*G06T 15/00*    (2011.01)

(52) U.S. Cl.
USPC ........................................................ 345/419

(58) Field of Classification Search
CPC .................. G06T 7/0081; G06T 2207/30004; G06T 11/001; G06T 15/08
USPC .................................................. 345/419, 420
See application file for complete search history.

(56) References Cited

U.S. PATENT DOCUMENTS

| | | | | |
|---|---|---|---|---|
| 5,903,664 | A * | 5/1999 | Hartley et al. | 382/154 |
| 6,366,800 | B1 * | 4/2002 | Vining et al. | 600/425 |
| 7,561,725 | B2 * | 7/2009 | Liang | 382/128 |
| 7,697,756 | B2 * | 4/2010 | Aharon et al. | 382/173 |
| 7,739,623 | B2 * | 6/2010 | Liang et al. | 715/848 |
| 7,936,922 | B2 * | 5/2011 | Berger | 382/173 |
| 8,331,669 | B2 * | 12/2012 | Artan et al. | 382/173 |
| 2006/0227131 | A1 | 10/2006 | Schiwietz et al. | 345/419 |
| 2008/0030497 | A1 * | 2/2008 | Hu et al. | 345/419 |
| 2008/0044072 | A1 * | 2/2008 | Kiraly et al. | 382/128 |
| 2009/0263000 | A1 * | 10/2009 | Shinagawa et al. | 382/131 |

OTHER PUBLICATIONS

S. Shah, A. Abaza, A. Ross, H. Ammar "Automatic tooth segmentation using active contour without edges", 2006, *IEEE Biometrics Symposium* (6 pages).
P. Krsek et al., "Teeth and jaw 3D reconstruction in stomatology", *Proceedings of the International Conference on Medical Information Visualisation—BioMedical Visualisation*, pp. 23-28, 2007.
H. Akhoondali et al., "Rapid Automatic Segmentation and Visualization of Teeth in CT-Scan Data", *Journal of Applied Sciences*, pp. 2031-2044, 2009.
H. Gao et al., "Automatic Tooth Region Separation for Dental CT Images", *Proceedings of the 2008 Third International Conference on Convergence and Hybrid Information Technology*, pp. 897-901, (2008).
Y. Kang, K. Engelke, W. Kalendar, "Interactive 3-D editing tools for image segmentation", *Medical Image Analysis*, 8 (2004), pp. 35-46.
Vladimir Vezhnevets, and Fadim Konouchine, "GrowCut—Interactive Multi-Label N-D Image Segmentation by Cellular Automata," *International Conf Computer Graphics and Vision 2005*), (7 pages).
R. Adams and L. Bischof, "Seeded Region Growing" , *IEEE Transactions on Pattern Analysis and Machine Intelligence, Jun. 1994*, vol. 16, pp. 641-647, 1994.
Commonly assigned U.S. Appl. No. 13/156,378, entitled: "System and Method for High Speed Digital Volume Processing," filed on Jun. 9, 2011, by Xiaoliang Li, et al.

* cited by examiner

*Primary Examiner* — Hau Nguyen
*Assistant Examiner* — Ryan M Gray

(57) ABSTRACT

A method for segmenting an object in a volume image, executed at least in part on a computer, renders the volume image data to a two-dimensional display screen showing first, second, and third mutually orthogonal planes in the two-dimensional rendering. One or more operator instructions that identify a plurality of seed points on the rendered volume image are accepted. Two-dimensional coordinates of the identified seed points on the display screen are converted to three-dimensional seed-point coordinates relating to the first, second, and third mutually orthogonal planes a segmentation operation is performed on the volume image according to the converted three-dimensional seed-point coordinates. Segmentation results are displayed on the display screen, relative to the first, second, and third mutually orthogonal planes.

17 Claims, 7 Drawing Sheets

SYSTEM AND METHOD FOR INTERACTIVE CONTOURING FOR 3D MEDICAL IMAGES

FIELD OF THE INVENTION

The present invention relates generally to three dimensional (3-D) medical image processing, and more particularly to methods that facilitate segmentation of anatomical structures using interactive contouring with GPU (graphics processing unit) processing.

BACKGROUND OF THE INVENTION

Imaging and image processing for computer-aided diagnosis and improved patient care are areas of interest to medical and dental practitioners. 3-D volume imaging has been a diagnostic tool that offers advantages over earlier 2-D (two dimensional) radiographic imaging techniques for identifying and evaluating the condition of internal structures and organs. 3-D imaging of a patient or other subject has been made possible by a number of advancements, including the development of high-speed imaging detectors, such as digital radiography (DR) detectors that enable multiple images to be taken in rapid succession. Digital volume images, obtained from computerized tomography (CT) or other imaging systems, provide tools for diagnosis, treatment planning, and biomedical modeling and visualization.

Among areas of particular interest for computer-aided diagnosis, treatment assessment, and surgery is image segmentation, particularly for tooth regions. Among approaches that have been proposed for tooth segmentation is that described by Shah et al. in "Automatic tooth segmentation using active contour without edges", 2006, *IEEE Biometrics Symposium*. The authors describe a method for automating identification of teeth based on dental characteristics from multiple digitized dental records, using an estimate of tooth contour in order to permit efficient feature extraction. It has been found, however, that extracting the contour of the teeth from other image content is a challenging task. In Shah's method, tooth contour estimation is accomplished using the active contour without edges, based on the intensity of the overall region of the tooth image. For a number of reasons, results of such processing demonstrate limited success in tackling this problem.

In an article entitled "Teeth and jaw 3-D reconstruction in stomatology", *Proceedings of the International Conference on Medical Information Visualisation—BioMedical Visualisation*, pp 23-28, 2007, researchers Krsek et al. describe 3-D geometry models of teeth and jaw bones based on input CT image data. The input discrete CT data are segmented by a substantially automated procedure, with manual verification and correction, as needed. Creation of segmented tissue 3-D geometry models is based on vectorization of input discrete data extended by smoothing and decimation. Segmentation is based primarily on selecting a threshold of Hounsfield Unit (HU) values and provides segmentation results in some cases. However, this method has not proved to be sufficiently robust for practical use.

Akhoondali et al. propose a fast automatic method for the segmentation and visualization of teeth in multi-slice CT-scan data of the patient's head in an article entitled "Rapid Automatic Segmentation and Visualization of Teeth in CT-Scan Data", *Journal of Applied Sciences*, pp 2031-2044, 2009. In the algorithm described therein, the mandible and maxilla are first separated using maximum intensity projection in the y direction and a step-like region separation algorithm. Next, the dental region is separated using maximum intensity projection in the z direction, thresholding, and cropping. Teeth are then segmented using a region growing algorithm based on multiple thresholds that distinguish between seed points, teeth and non-tooth tissue. Results are visualized using iso-surface extraction and surface and volume rendering. A semi-automatic method is also proposed for rapid metal artifact removal. However, in practice, it is difficult to identify the needed threshold values for a proper segmentation operation.

In an article entitled "Automatic Tooth Region Separation for Dental CT Images", *Proceedings of the 2008 Third International Conference on Convergence and Hybrid Information Technology*, pp 897-901, (2008), researchers Gao et al. disclose a method to construct and visualize the individual tooth model from CT image sequences. This method attempts to separate teeth for CT images wherein the teeth touch each other in some slices. The method finds the individual region for each tooth and separates two teeth if they touch. The method described initially separates upper and lower tooth regions and fits the dental arch. A plane is projected along each arch point and the corresponding integral intensity is computed. The resulting values are then used to draw a profile and determine the position of the separating plane. The position identification of the tooth region can guide the segmentation of individual tooth contours in 2-D space and tooth surface in 3-D space. However, methods of this type often fail to separate the teeth correctly; often the cut lines extend across the teeth rather than along tooth edges.

Various methods have been proposed for improving interactive segmentation. For example, Kang et al., in a recently published article entitled "Interactive 3-D editing tools for image segmentation", *Medical Image Analysis*, 8 (2004), pp. 35-46, describe an interactive 3-D editing tool for image segmentation. Editing tools are used to identify a volume of interest (VOI) in a 3-D image and to correct errors in initial automatic segmentation procedures. A viewer uses the editing tools to position and size a spherical volume of interest; and the spherical geometric primitive is visualized using other geometric primitives (possibly with different dimensionality) in separate multi-planar reformations. The user interface described by Kang et al. shows orthogonal presentations of axial, sagittal, and coronal views in three different viewing windows. This method of providing input to segmentation routines can be useful for regions whose shape is spherical, but is of less value for providing information related to actual anatomical features. Its presentation mode requires the user to mentally reconstruct the original geometric primitive using the three standard orthogonal views.

As 3-D data is often presented in its projection form in a 2-D space, such as on a display screen, one concern relates to intuitive design and convenience for supporting effective 3-D data contouring. Conventionally, a slice-by-slice method is used to perform contouring work, outlining the contour or drawing seed curves on a plurality of the 2-D cross-sectional images. These contours traced in the 2-D images are then assembled into 3-D space. However, in some cases, significant features are not revealed in the axial direction of the parallel slices (or cross-sectional images) but are more visible when viewed from other directions.

In 3-D interactive contouring, rapid response and visual feedback of operation results is required in order to make corrections by adding or removing geometric primitives such as curves, lines or points. Among other advantages, efficient operation and high speed processing helps to make the interactive contouring workflow more natural and easier for the operator.

Thus, it is seen that there is a need for a method that provides an improved interactive contouring for medical images

SUMMARY OF THE INVENTION

It is an object of the present invention to advance the art of volume image processing and segmentation. Embodiments of the present invention use GPU based technology, with a consolidated viewing window for the visualization of multi-planar projections of a three dimensional volume to facilitate entering geometric primitives by the user, and use a consolidated approach to the rendering of geometric primitives and object contours (surfaces) using GPU based operations.

Advantageously, embodiments of the present invention simplify the segmentation task for a volume image. User input, entered in 2-D coordinate space, is converted to 3-D space to facilitate volume segmentation.

These and other aspects, objects, features and advantages of the present invention will be more clearly understood and appreciated from a review of the following detailed description of the preferred embodiments and appended claims, and by reference to the accompanying drawings.

The present invention provides a method for segmenting an object in a volume image, the method executed at least in part on a computer and comprising: rendering the volume image data to a two-dimensional display screen showing first, second, and third mutually orthogonal planes in the two-dimensional rendering; accepting one or more operator instructions that identify a plurality of seed points on the rendered volume image; converting two-dimensional coordinates of the identified seed points on the display screen to three-dimensional seed-point coordinates relating to the first, second, and third mutually orthogonal planes; performing a segmentation operation on the volume image according to the converted three-dimensional seed-point coordinates; and displaying the segmentation results on the display screen, relative to the first, second, and third mutually orthogonal planes.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
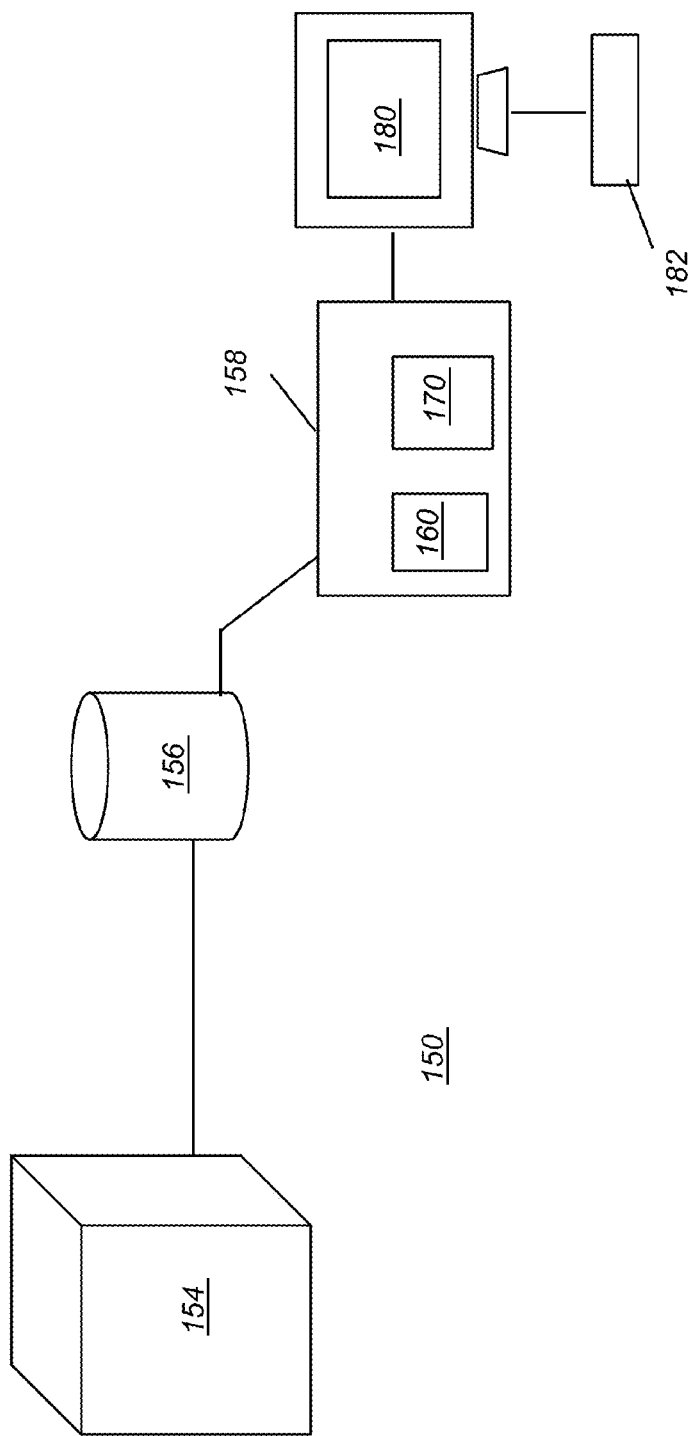
FIG. 1 is a schematic diagram of a computer system for executing an embodiment of the present invention.

In the following detailed description of embodiments of the present invention, reference is made to the drawings in which the same reference numerals are assigned to identical elements in successive figures. It should be noted that these figures are provided to illustrate overall functions and relationships according to embodiments of the present invention and are not provided with intent to represent actual size or scale.

In the context of the present disclosure, the descriptive term "object of interest" generally indicates an object such as a tooth, organ, bone, or other anatomical structure. The terms "viewer", "user", and "operator" are considered to be equivalent, all referring to an individual who views and interacts with the volume imaging system.

Contouring is one particularly useful component of user intervention and is an intermediate step in the process for segmentation of medical images whereby the object of interest (foreground) is delineated from the background. In the context of the present disclosure, contouring and seed drawing or seed entry are considered equivalent operations.

In segmentation applications for medical images, automatic object extraction is desirable, but is sometimes unattainable due to limitations imposed either by the process of image acquisition or by abnormalities in the scene, or both. As a consequence, operator intervention is often useful. For example, the operator may enter pivotal hints in the images in the form of geometric primitives for seed point entry. Various operator-assisted segmentation techniques have been developed for teeth and bone structures, bodily organs, and other types of objects. These include techniques in which the viewer makes a mark or stroke on a displayed image to help differentiate foreground features of an object from the background, as well as eye gaze tracking and other techniques that directly or indirectly obtain instructions from the viewer.

While it may offer some benefits, 3-D volume imaging works with large amounts of data and requires considerable data processing resources, with high CPU usage and long processing times. Image processing utilities for 3-D volume imaging include volume segmentation for partitioning a three-dimensional image set into a plurality of non-overlap regions. As an example of a segmentation process, the GrowCut segmentation algorithm (described in "GrowCut—Interactive Multi-Label N-D Image Segmentation By Cellular Automata," by Vladimir Vezhnevets, and Fadim Konouchine, *International Conf. Computer Graphics and Vision* 2005) stores at least five intermediate three-dimensional image sets in order to perform its segmentation. With this much data to process, computation cost is often a concern and the CPU (central processing unit)-based GrowCut algorithm require relatively long computation time. For a medium-size volume data set (e.g. 181×147×242 voxels), the execution time using GrowCut segmentation proves impractical.

One solution for processing the massive amounts of data needed to support functions such as image segmentation is the use of a dedicated Graphical Processing Unit (GPU). Originally developed for computer game and simulation applications, the GPU has evolved from a dedicated graphic display processor with a fixed pipeline to a more capable processor for general purpose computing, matrix computing, image processing, simulation and medical imaging using parallel processing with the programming pipeline. GPU architecture and its parallel processing capabilities have been utilized for providing hardware-accelerated volume image rendering of CT and other images, as described in U.S. Patent Application No. 2006/0227131 entitled "Flat Texture Volume Rendering" by Schiwietz et al. This approach stores the 3-D image slices as flat texture data. While such a method improves some aspects of image storage and addressing, however, it does not facilitate update of the volume image data and makes it cumbersome to apply processing such as bilinear filtering, for example, that requires facile computation between neighboring voxels. It is necessary to calculate the tile offsets in the flat volume in order to find neighbors for a voxel. Such calculation can slow the shader performance considerably, since it is required for every voxel in the GPU shader program. Significantly, because of the complexity and time required for addressing neighboring voxels, the method taught in Schiwietz et al. '7131 is not well suited to support segmentation, such as using the GrowCut algorithm noted earlier.

While GPU capabilities offer some promise for improving processing speed and capability overall, a number of significant problems remain. GPU programming is not straightforward and requires different strategies for data storage and addressing than those conventionally applied for central processing unit (CPU) schemes. The graphic pipeline API of the GPU does not directly handle volume imaging structures, but requires re-mapping of image data to existing data structures, which can be time consuming and can make functions such as image filtering more difficult to execute than when using conventional data representation. Even with high level programming languages designed for GPU interaction, such as OpenCL, CUDA, CAL and Brook, careful implementation design is a significant factor for achieving improvements in volume imaging performance.

One aspect of the problem relates to the task of mapping the existing volume image data structures into a form that can be readily handled by the GPU and to addressing schemes needed to harness the capability of the GPU for high-level image processing such as registration, filtering, and segmentation. This problem has been addressed, for example, in commonly assigned co-pending patent application Ser. No. 13/156,378 entitled "SYSTEM AND METHOD FOR HIGH SPEED DIGITAL VOLUME PROCESSING", incorporated herein by reference.

Fully automated segmentation is considered to be an unrealistic goal in most applications and some type of operator interaction is generally used to help direct and focus the operation of automated utilities. It would be desirable to find methods that can overcome the drawbacks noted in the background section and to provide users with a more robust tool for contouring and segmentation.

FIG. 1 is a schematic block diagram that shows parts of a volume image processing apparatus 150 according to an embodiment of the present invention. A volume imaging apparatus 154, such as a CT imaging apparatus, obtains the volume image of a patient or other subject. A computer-accessible memory 156 stores the obtained volume images for subsequent processing and display. A computer 158 accesses memory 156 in order to access and process the volume image data. Computer 158 has a control processing unit (CPU) 160 for handling overall logic and control functions. In addition, computer 158 also has a Graphics Processing Unit (GPU) 170 that provides improved processing for volume imaging. A display 180 is used to display the processing results for a medical practitioner or other viewer and includes an operator interface 182 with the markup tools for contour (or seed) entry, such as a mouse or other pointer, touch screen, or other operator interface utility.

Embodiments of the present invention use the GPU 170 for high speed digital volume processing to support segmentation and other complex operations. Embodiments of the present invention help to overcome inherent limitations of display technology, in which 2-D representation must be used for a 3-D volume.

Figure 2:
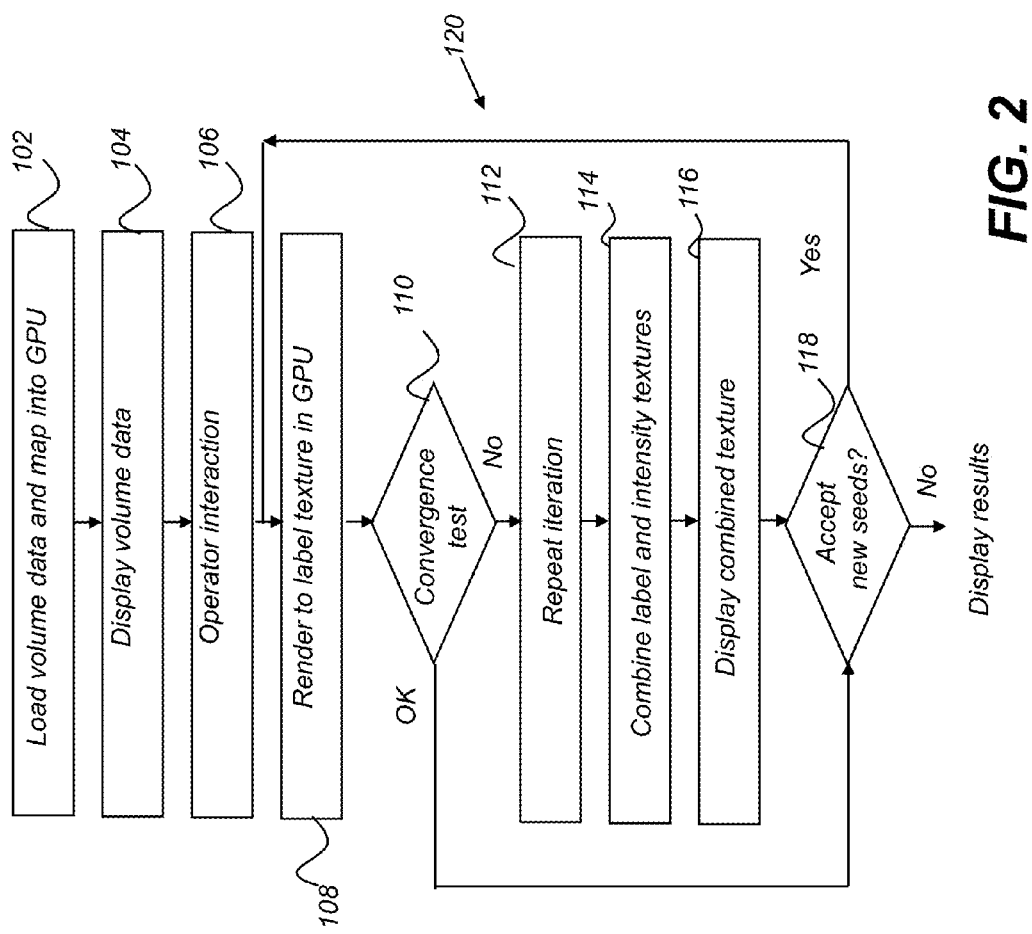
FIG. 2 is a diagram showing the steps of the present invention.

Referring to the logic flow diagram of FIG. 2, there is shown a sequence of steps used for segmenting anatomical objects from a 3-D volume image using operator-entered contour information on a 2-D display according to an embodiment of the present invention. The 3-D interactive contouring method of FIG. 2 permits the user to use geometric primitives to place seed points or hints relative to the anatomical structures of interest in multi-planar representations of the 3-D volume, tracing the geometric primitive against a 2-D representation of the 3-D image instead of requiring slice-by-slice contouring of 2-D projection images. In this way, the contouring method allows the interactive marking of multiple axial, sagittal or coronal slices of the 3-D volume at one time in a single annotation action. Given this contour information, segmentation algorithms, such as the GrowCut technique proposed by Vezhnevets et al. can be employed in the interactive process for the delineation of the anatomical structures or objects of interest. Aspects of the interactive process are of particular interest in this disclosure.

Following the sequence of steps shown in FIG. 2, in a loading step 102, the volume data is first loaded and mapped into an intensity texture in the GPU. The intensity texture is two dimensional in the present method. In contrast to three dimensional texture, two dimensional texture has some advantages, such as requiring only a single texture update per operation and efficient use of GPU parallelism. To take advantage of these benefits, the three-dimensional volume that displays is converted to the two-dimensional data structure of the GPU. In loading step 102 of the present invention, the three-dimensional volume data is flattened slice by slice into a two-dimensional image ready for processing in the GPU.

Figure 3:
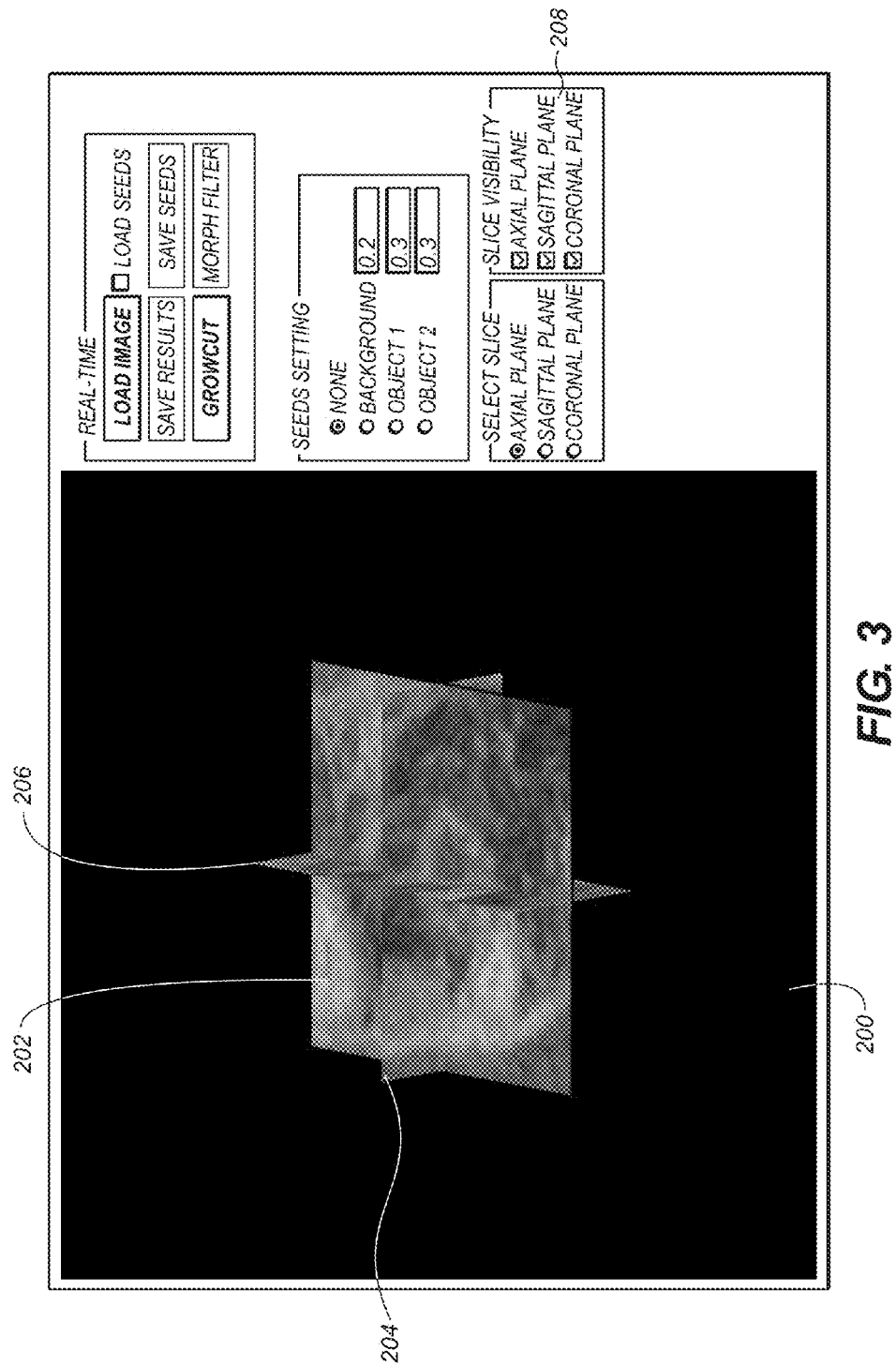
FIG. 3 is a view of a display window.

Next, in a display volume step 104, the volume data is rendered to the display screen for user intervention as three mutually orthogonal planes representing axial, sagittal, and coronal views, respectively. FIG. 3 shows an example in which 3-D volume data is displayed on the 2-D screen, in a way that allows representation of the orthogonal 3-D planes for a small portion of the volume image. In this exemplary configuration, there are three exemplary orthogonal planes, an axial plane 202, a sagittal plane 204, and a coronal plane 206. Each of planes 202, 204, and 206 slice through the 3-D volume space and are visualized or rendered in the single 2-D plane 200 that displays. The rendered volume can be translated, rotated and zoomed in/out by mouse operations or using some other suitable pointer device. Meanwhile, the 3 orthogonal planes can be moved along their respective normal directions back and forth by the user, such as by dragging the computer mouse, for example. The relative angles of the orthogonal axes can be changed by pivoting relative to the origin at the intersection of the planes. A set of controls 208 enable the viewer to select which of the orthogonal planes are visible.

As noted previously, with conventional 3-D contouring systems, the 3-D volume data may be visualized as a 3-D entity on a 2-D display device. 3-D volume contouring on a 2-D display device is conventionally achieved by editing multiple 2-D slices, one 2-D slice at a time. Therefore, as described in the Kang et al. article cited previously, an operator interface for contouring when using these systems typically presents three separate image windows, each image window representing one of the 2-D axial, sagittal, and coronal views, respectively. To perform contouring in the conventional workflow, the user places seed points in each of these three images separately, in multiple drawing operations, visually keeping track of approximate seed or other contour placement when moving from one 2-D slice or view to the next. As has been noted, this mode of operation is awkward, error-prone, and time consuming. For contouring, this method often requires the user to focus and enter seed data in a dimension that is inconsistent with the dimension of the displayed data itself. Because this mode of operation confines the user's view to a lower dimension space (2-D), it makes it difficult to mentally correlate what is being performed in a lower dimension space to its effect for identifying a region of a tooth in a higher dimensional space (3-D).

Embodiments of the present invention provide a user with more intuitive tools for applying a desired 3-D seed point setting to a 3-D volume data, using familiar 2-D tools on a conventional 2-D display device. To achieve this, the three separate image windows (axial, sagittal, and coronal) are combined or consolidated into a single window as shown in FIG. 3, enabling simultaneous multiple-plane drawing operations with only one single 3-D drawing operation.

Figure 4:
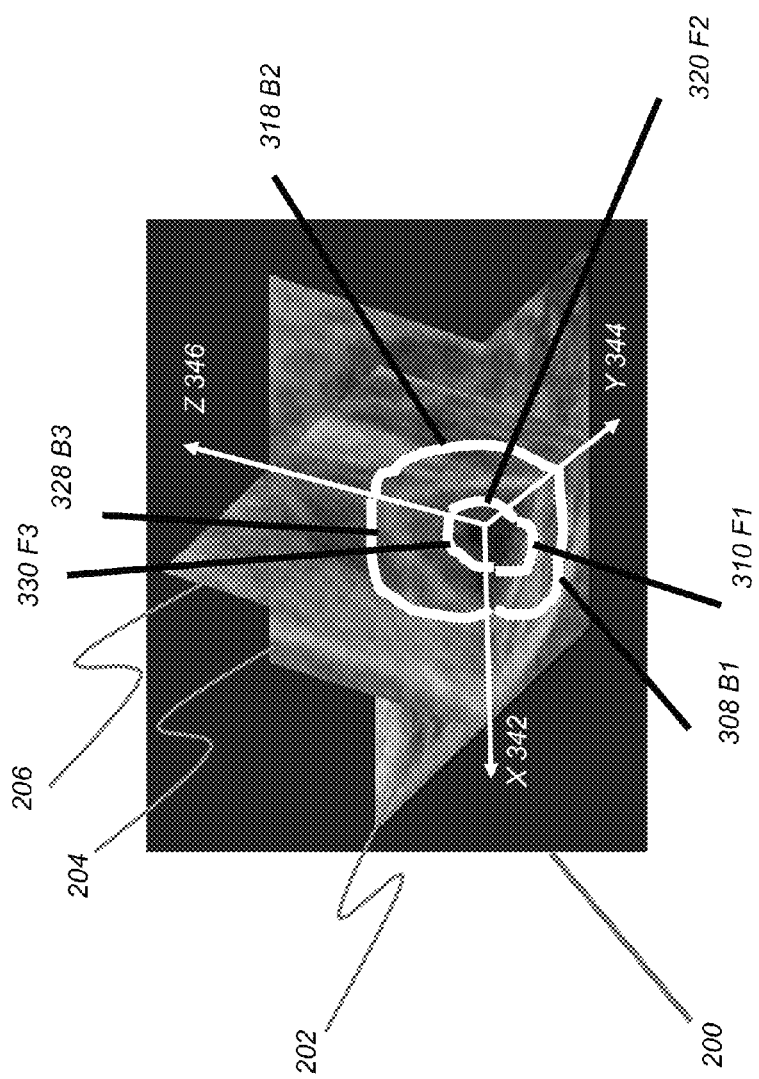
FIG. 4 is a view that shows drawing seed points on the display.

As shown in FIG. 4, the three orthogonal axial, sagittal, and coronal planes 202, 204 and 206 slice through the 3-D volume space and are visualized or rendered in the single 2-D plane 200. For convenience, an xyz coordinate system, x (342), y (344) and z (346), is defined for the combined views in this figure. In the sequence of FIG. 2, exemplary seed points are entered by the operator in an operator interaction step 106. Seed points entered in the display window of 2-D plane 200 are represented as two generally circular geometric primitives in FIG. 4. The operator can trace this pattern on the display screen, such as with a mouse or using a touch screen display, or may select or enter individual points that can be connected to form the curved primitives shown.

In volume imaging apparatus 150 of FIG. 1, the computer system accepts/receives/accesses the operator instructions that identify these seed points on the volume image and obtains and stores the corresponding two-dimensional coordinates of the identified seed points. To facilitate entry of seed point information on the volume image, the operator can interactively adjust aspects of visibility of the orthogonal planes in the display in 2-D plane 200 of FIGS. 3 and 4. In operator interaction step 106, the operator traces out a pattern that outlines the volume to be segmented, and can iteratively adjust the entered pattern by changing the view angle of the coordinate axes, for example, as well as by using pan and zoom utilities. This 2-D contour tracing data appears in a superimposed form against the underlying display of the volume image.

Following entry of the seed points as 2-D data is the conversion to 3-D volume space coordinates. Considering the example of FIG. 4, each of the displayed primitives entered by the operator in operator interaction step 106 can be decomposed into three orthogonal curved line segments. In this example, line segments B1 (308), B2 (318) and B3 (328) constitute the larger circular pattern, line segments F1 (310), F2 (320) and F3 (330) constitute the smaller circle. Segments B1 (308) and F1 (310) are associated with plane 202 that is shown in parallel to the x-y plane of the xyz coordinate system. Line segments B2 (318) and F2 (320) are associated with plane 206 that is shown in parallel to the y-z plane of the xyz coordinate system. Line segments B3 (328) and F3 (330) are associated with plane 204 that is shown parallel to the x-z plane of the xyz coordinate system. In practice, the seed points of these line segments are defined and recorded with respect to the screen coordinate system, that is, with plane 200, which is 2-dimensional. It is necessary to know the corresponding voxel coordinates of these 2-D seed points in 3-D volume space for 3-D volume segmentation. The conversion of 2-D screen coordinates of the seed points takes place in step 108 of FIG. 2, followed by executing a seed drawing fragment shader that is used in a rendering step 108 to render these converted 3-D coordinates into a unit label texture in GPU memory. Consistent with an embodiment of the present invention, a shader is a GPU program written in OpenGL.

Continuing with the logic flow shown in FIG. 2, provided with the intensity and label textures, the GPU based iterative segmentation algorithm is triggered following rendering step 108. At the beginning of each iteration in a loop 120, a convergence test 110 is performed to check if the algorithm converges, using an occlusion query or other suitable technique. During this stage, the previous and current label textures are compared to determine whether or not they are the same. If this verification is negative, the algorithm continues to carry out another iteration in a repeat iteration step 112. At the end of each algorithm iteration, the label texture is updated.

Figure 5:
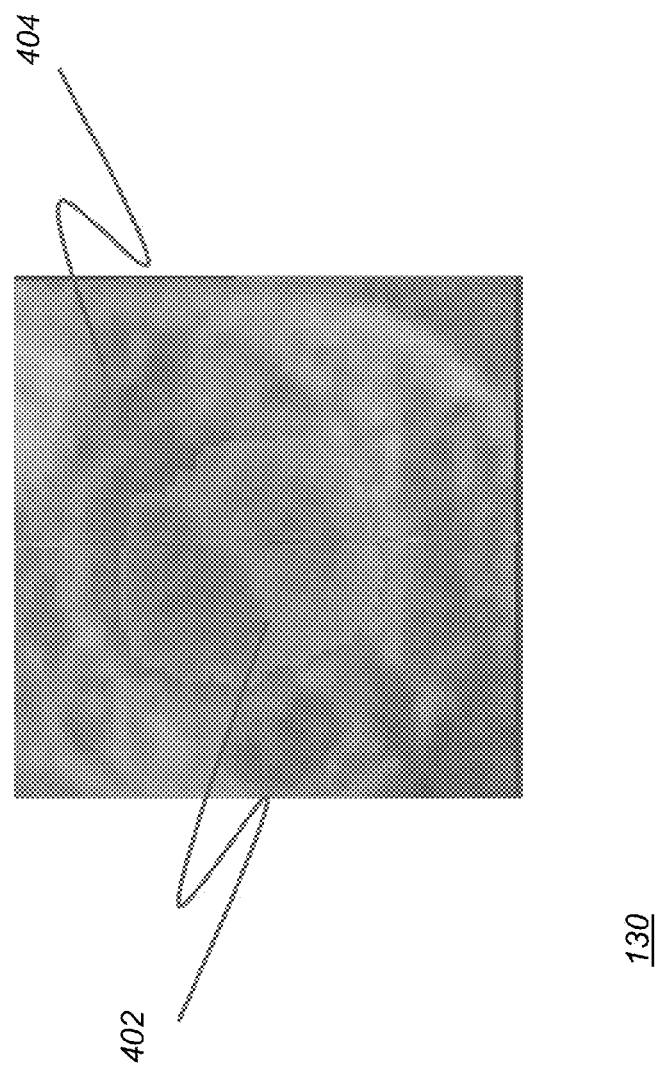
FIG. 5 is a view illustrating the combined intensity and label information.

In a combination step 114, the updated label texture is superimposed on the intensity texture to obtain a mixed texture containing volume image intensity with colored label information. This combining is achieved by a composite fragment shader, an OpenGL utility. FIG. 5 shows an exemplary combining result, a combined or mixed texture 130 with an inner foreground area 402 and an outer background area 404, which can be shown in different colors, for example.

In a display step 116 of FIG. 2, the combined texture 130 is displayed, showing the three orthogonal planes as in FIGS. 3 and 4. In a decision step 118, the user can inspect this intermediate segmentation result to determine if seed points need to be added, modified, or removed in order to improve the segmentation results. Advantageously, this allows the user to manipulate 3-D data, and to observe the result of such a 3-D operation, directly in 3-D space. Where no further seed points are needed, segmentation processing then completes and results can be displayed.

Figure 6:
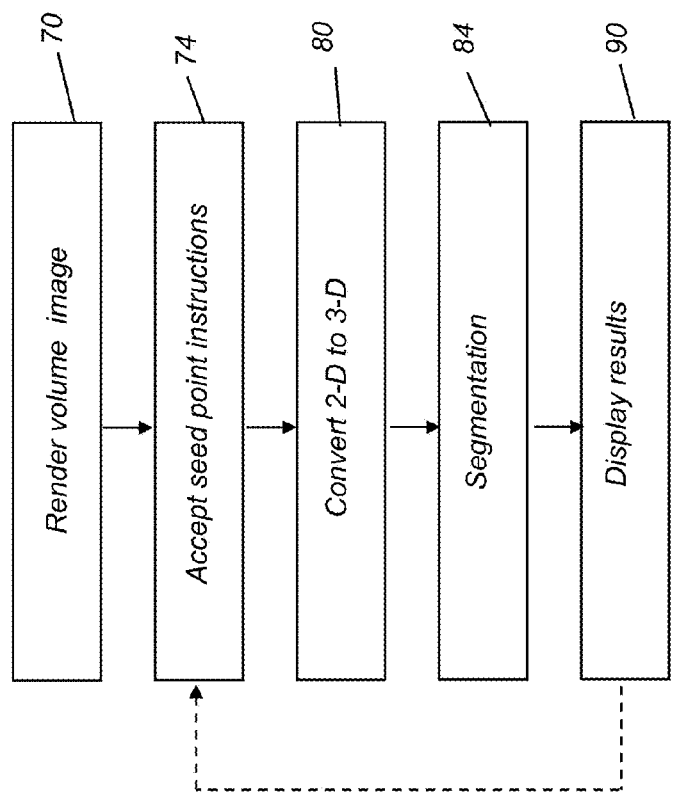
FIG. 6 is a logic flow diagram that shows steps of the present invention according to one embodiment.
Figure 7:
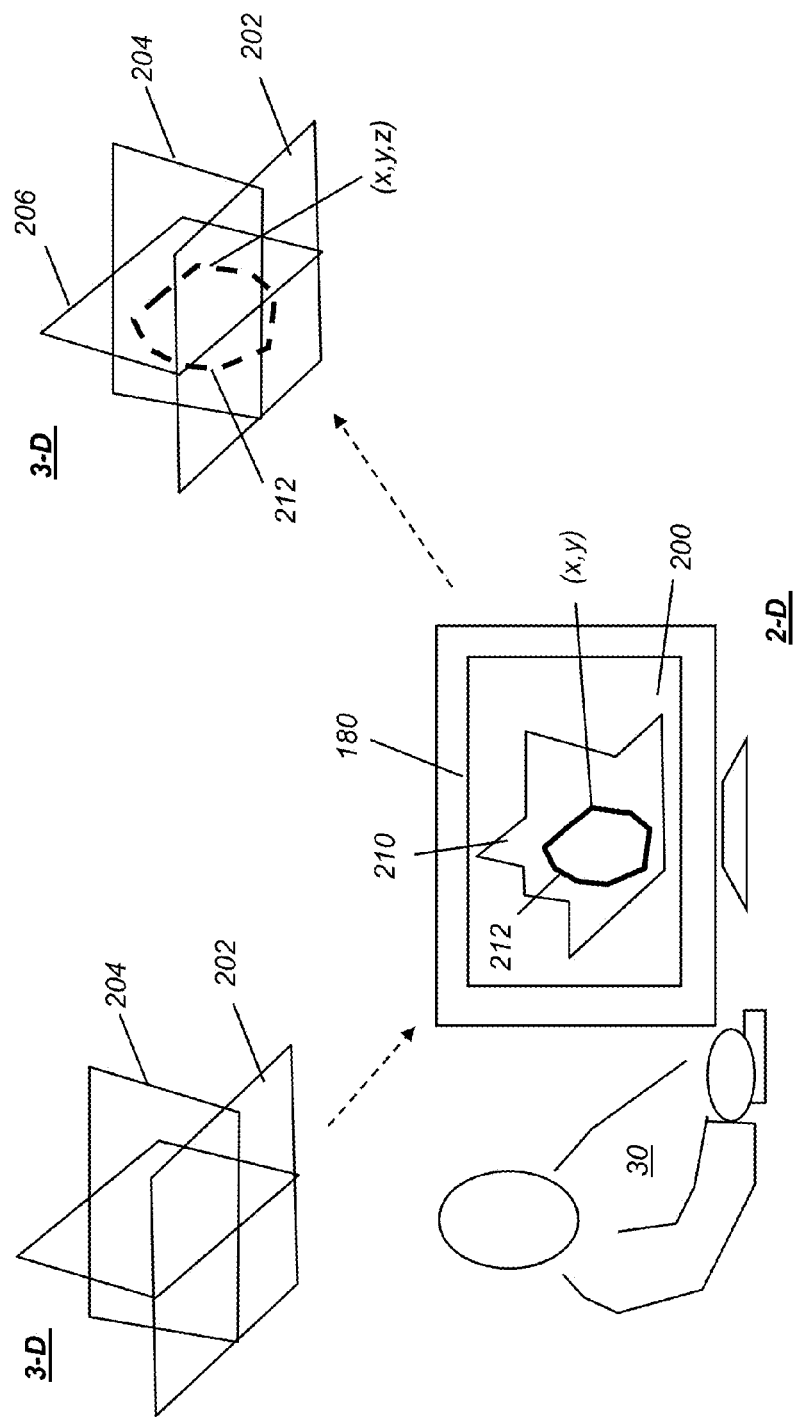
FIG. 7 is a schematic diagram that shows seed point identification and conversion processing.

The logic flow diagram of FIG. 6 shows steps executed by computer 158 (FIG. 1) according to an embodiment of the present invention, employing both CPU 160 and GPU 170. FIG. 7 shows part of this process in a schematic form. In a rendering step 70, the volume data displays as a 2-D image 210 in 2-D plane 200, rendered on display 180, as shown in FIG. 7. The viewer has the option of selecting the view angle for the 2-D representation of the volume image that displays, as well as tools for pan, zoom, and other viewing functions. The computer accepts/receives/accesses viewer input to identify one or more seed points in an accept instructions step 74. Seed points corresponding to a region of the tooth are entered with reference to the displayed 2-D plane 200, as described previously, with (x, y) coordinates. When seed points have been entered by a user 30, such as by using a geometric primitive 212 as shown in FIG. 7, a conversion step 80 converts the (x, y) 2-D coordinates of the entered seed points to 3-D (x, y, z) seed point coordinates related to first, second, and third orthogonal planes 202, 204, and 206 and these coordinates are recorded in memory. Seed points themselves can relate to foreground or background image content and may be displayed with different appearance, such as in different colors for example. A segmentation step 84 for identifying the region of the tooth follows, using the 3-D coordinates that have been obtained from the conversion process. A display step 90 then displays the segmentation results on the display screen, relative to the orthogonal 3-D planes.

Conversion algorithms for transforming 2-D coordinates to 3-D coordinates in step 80 are well known to those skilled in the image processing arts. Conversion typically uses matrices or other mathematical tools to provide straightforward processing that correlates pixels displayed in 2-D at particular angles to voxels within a corresponding 3-D volume. Conversion algorithms of this type are widely used in gaming applications, for example. According to an embodiment of the present invention, a type of reverse-mapping is used, taking advantage of fact that the 2-D display has already been mapped from 3-D volume data. Reversing this mapping correlates entered seed-point coordinates, entered with respect to 2-D pixels, with the corresponding mapped voxel coordinates for the 3-D volume.

Consistent with an embodiment of the present invention, the system responds to the user interaction in real time. The segmentation process is visualized for the user as it progresses in order to determine if seed adjustment is needed. Hence, the applied segmentation algorithms are those derived from a set of seed points to the final segmentation result, via multiple iterations. Meanwhile, the derivation process is visualized by rendering the intermediate segmentation results to the display screen.

Embodiments of the present invention are compatible with any of a number of segmentation algorithms. The general sequence described herein provides a general framework that is applicable with any segmentation algorithm that relies on initial seed points, such as region-growing (see "Seeded Region Growing" by R. Adams and L. Bischof, *IEEE Transactions on Pattern Analysis and Machine Intelligence*, June 1994, vol 16, pp. 641-647, 1994) and the GrowCut algorithm, noted previously, as well as other segmentation approaches.

The present invention is described as a method. However, in another preferred embodiment, the present invention comprises a computer program product for medical applications in accordance with the method described. In describing the present invention, it should be apparent that the computer program of the present invention can be utilized by any well-known computer system, such as the personal computer. The use of a GPU is advantageous, particularly for its speed of execution with the re-mapped 2-D data, but is not required. However, many other types of computer systems can be used to execute the computer program of the present invention.

Consistent with an embodiment of the present invention, a computer executes a program with stored instructions that perform on image data accessed from an electronic memory. As can be appreciated by those skilled in the image processing arts, a computer program of an embodiment of the present invention can be utilized by a suitable, general-purpose computer system, such as a personal computer or workstation, as well as by a microprocessor or other dedicated processor or programmable logic device. However, many other types of computer systems can be used to execute the computer program of the present invention, including networked processors. The computer program for performing the method of the present invention may be stored in a computer readable storage medium. This medium may comprise, for example; magnetic storage media such as a magnetic disk (such as a hard drive) or magnetic tape or other portable type of magnetic disk; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It is noted that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

It is noted that the term "memory", equivalent to "computer-accessible memory" in the context of the present disclosure, can refer to any type of temporary or more enduring data storage workspace used for storing and operating upon image data and accessible to a computer system. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing processes and for recording entered values, such as seed points, or storing intermediate and final results of calculations and other processing. Computer-accessible memory can be volatile, non-volatile, or a hybrid combination of volatile and non-volatile types. Computer-accessible memory of various types is provided on different components throughout the system for storing or recording, processing, transferring, and displaying data, and for other functions.

The subject matter of the present invention relates to digital image processing, which is understood to mean technologies that digitally process a digital image to recognize and thereby assign useful meaning to human understandable objects, attributes or conditions, and then to utilize the results obtained in the further processing of the digital image.

Embodiments of the present invention have been described in detail with particular reference to presently preferred embodiments, but it will be understood that variations and modifications can be effected within the scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for segmenting an object in a volume image, the method executed at least in part on a computer and comprising:
   rendering the volume image data to a two-dimensional display screen showing first, second, and third mutually orthogonal planes in the two-dimensional rendering;
   accessing one or more operator instructions that identify a plurality of seed points on the rendered volume image, the identified plurality of seed points simultaneously covering the first, second, and third mutually orthogonal planes, and the identified plurality of seed points including geometry and intensity information of the object;
   converting two-dimensional coordinates of the identified plurality of seed points displayed on the display screen to three-dimensional seed-point coordinates relating to the first, second, and third mutually orthogonal planes;

segmenting the volume image according to the converted three-dimensional seed-point coordinates and the geometry and intensity information;

while segmenting, displaying at least one intermediate segmentation result on the display screen, relative to the first, second, and third mutually orthogonal planes; and displaying a final segmentation result on the display screen, relative to the first, second, and third mutually orthogonal planes.

2. The method according to claim 1 further comprising accessing one or more additional operator instructions that identify one or more additional seed points on the at least one intermediate displayed segmentation results and repeating the steps of:

converting two-dimensional coordinates of the identified seed points on the display screen to three-dimensional seed-point coordinates relating to the first, second, and third mutually orthogonal planes;

performing an additional segmentation operation on the volume image according to the converted three-dimensional seed-point coordinates; and displaying the results of the additional segmentation on the display screen, relative to the first, second, and third mutually orthogonal planes.

3. The method according to claim 1 wherein the seed points identify a region of a tooth.

4. The method according to claim 1 wherein rendering the volume image data further comprises mapping the volume image data to a graphics processing unit intensity texture.

5. The method of claim 1 wherein accessing the one or more operator instructions comprises recording one or more of the seed points according to entries from a computer mouse or other pointer.

6. The method of claim 1 wherein the seed points include seed points for background and foreground image content and display in different colors.

7. The method of claim 1 further comprising using the identified seed points for a region-growing operation.

8. A method for segmenting an object in a volume image, the method executed at least in part on a computer and comprising:

mapping the volume image data to a graphics processing unit intensity texture;

rendering the mapped volume image data to a display screen showing first, second, and third mutually orthogonal planes;

accessing operator instructions that identify a plurality of seed points on the mapped volume image;

converting two-dimensional coordinates of the identified seed points to three-dimensional coordinates in volume space;

rendering the three-dimensional coordinates to a graphics processing unit label texture;

iteratively performing an iterative segmentation that combines the mapped volume image data in the intensity texture with the rendered label texture data to form a mixed texture; and displaying the mixed texture of each iteratively performed segmentation on the display screen, showing the first, second, and third mutually orthogonal planes.

9. The method of claim 8 wherein the intensity texture is a two-dimensional texture object in the graphics processing unit.

10. The method of claim 8 wherein mapping the volume image data further comprises:

flattening the volume image to a plurality of two-dimensional image slices; and uploading the two-dimensional image slices to a two-dimensional texture object in the graphics processing unit.

11. The method of claim 8 wherein accessing the operator instructions comprises recording one or more of the seed points according to entries from a computer mouse or other pointer.

12. The method of claim 8 wherein the seed points include seed points for background and foreground image content and display in different colors.

13. The method of claim 8 further comprising using the identified seed points for a region-growing operation.

14. The method of claim 8 further comprising updating the label texture one or more times, according to one or more segmentation iterations.

15. The method of claim 8 wherein the object is a tooth.

16. The method of claim 8 wherein the mixed texture is a two-dimensional texture object in the graphics processing unit.

17. A method for segmenting an object in a volume image, the method executed at least in part on a computer, comprising:

rendering the volume image data to a 2D display screen showing first, second, and third mutually orthogonal planes in the 2D rendering;

accessing one or more operator instructions that identify a plurality of seed points on the rendered volume image;

converting 2D coordinates of the identified plurality of seed points displayed on the display screen to 3D seed-point coordinates relating to the first, second, and third mutually orthogonal planes;

segmenting the volume image according to the converted 3D seed-point coordinates;

automatically displaying a plurality of intermediate segmentation results on the display screen, relative to the first, second, and third mutually orthogonal planes; and automatically displaying a final segmentation result on the display screen, relative to the first, second, and third mutually orthogonal planes.

* * * * *